United States Patent [19]

Saito

[11] Patent Number: 5,596,599

[45] Date of Patent: Jan. 21, 1997

[54] SPREAD SPECTRUM RECEIVING APPARATUS

[75] Inventor: Katsuo Saito, Yokohama, Japan

[73] Assignee: Canon Kabushiki Kaisha, Tokyo, Japan

[21] Appl. No.: 156,019

[22] Filed: Nov. 23, 1993

[30] Foreign Application Priority Data

Dec. 4, 1992 [JP] Japan ................................. 4-350834
Jan. 29, 1993 [JP] Japan ................................. 5-32443

[51] Int. Cl.$^6$ ................................................ H04B 1/69
[52] U.S. Cl. ........................................ 375/200; 375/208
[58] Field of Search ...................... 375/1, 200, 208–210, 375/206

[56] References Cited

U.S. PATENT DOCUMENTS

| | | | |
|---|---|---|---|
| 4,621,365 | 11/1986 | Chiu | 375/208 |
| 5,090,023 | 2/1992 | Watanabe et al. | 375/208 |
| 5,099,495 | 3/1992 | Mikoshiba et al. | 375/208 |
| 5,218,620 | 6/1993 | Mori et al. | 375/206 |
| 5,280,538 | 1/1994 | Kataoka et al. | 375/1 |
| 5,309,474 | 5/1994 | Gilhousew et al. | 375/1 |
| 5,319,672 | 6/1994 | Sumiya et al. | 375/1 |
| 5,347,537 | 9/1994 | Mori et al. | 375/208 |
| 5,353,303 | 10/1994 | Walthall | 375/1 |

FOREIGN PATENT DOCUMENTS

| | | |
|---|---|---|
| 0500079 | 2/1992 | European Pat. Off. . |
| 3131185 | 2/1983 | Germany . |
| 4009458 | 9/1990 | Germany . |
| WO8704883 | 8/1987 | WIPO . |

*Primary Examiner*—Salvatore Cangialosi
*Attorney, Agent, or Firm*—Morgan & Finnegan L.L.P.

[57] ABSTRACT

There is provided a receiving apparatus for receiving a signal which was spread spectrum diffused, comprising converting means for converting a frequency of the received signal; and arithmetic operating means for arithmetically operating the signal converted by the converting means and a diffusion code, wherein the converting means converts a frequency of the received signal in accordance with an output of the arithmetic operating means, so as to improve receiving characteristics of a spread spectrum receiving apparatus.

21 Claims, 9 Drawing Sheets

FIG. 5
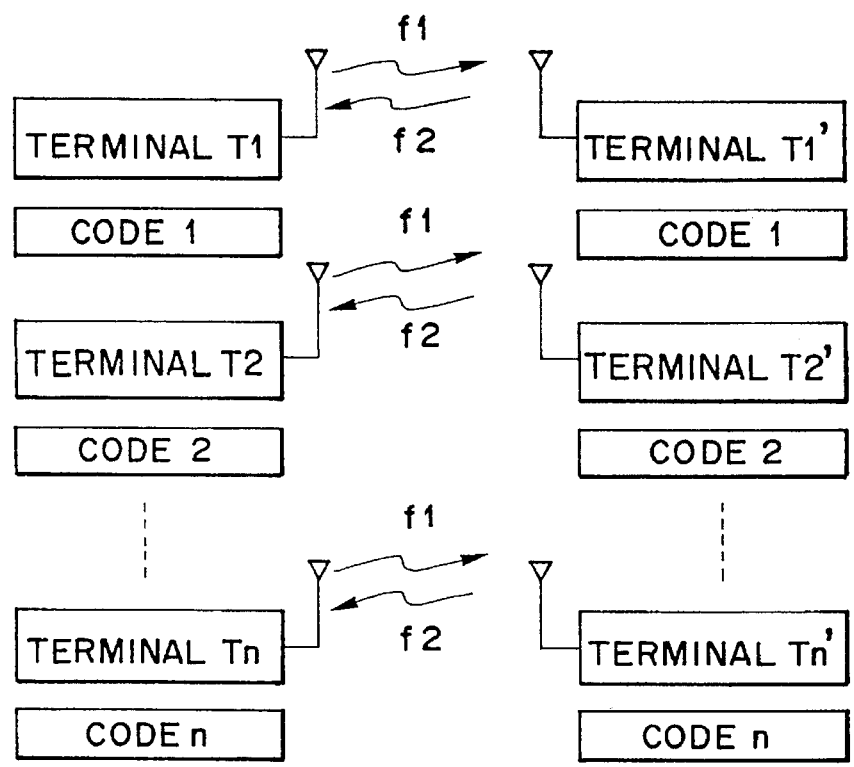
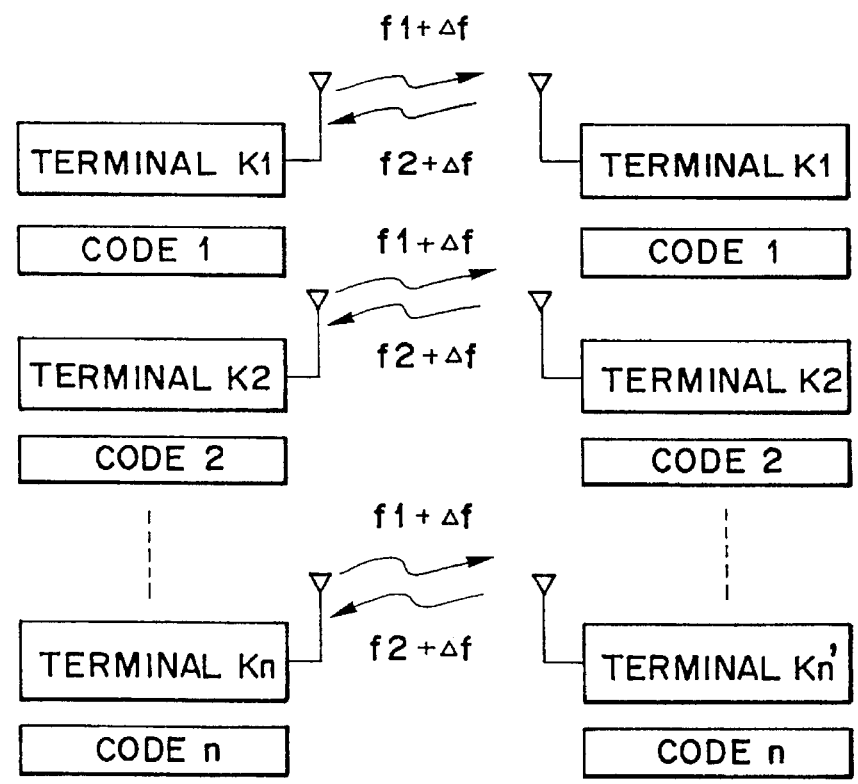

5,596,599

SPREAD SPECTRUM RECEIVING APPARATUS

BACKGROUND OF THE INVENTION

1. Field of the Invention

The invention relates to a spread spectrum receiving apparatus for receiving a spread spectrum signal.

2. Related Background Art

Hitherto, in a spread spectrum communication using a convolver, as shown in FIG. 10, a communication partner is determined by collations of diffusion codes $CODE_1$ to $CODE_n$ which terminals $T_1$ to $T_n$ and $T_1'$ to $T_n'$ have as shown in FIG. 10.

Namely, an apparatus cannot communicate with a terminal equipment having another code and can communicate with a terminal equipment of only the same code.

FIG. 11 is a block diagram briefly showing the above principle.

In FIG. 11, a reception wave inputted from an antenna (not shown) is down converted into a desired IF frequency and is supplied to one input terminal $2a$ of a correlator 1.

A reference signal which has previously been diffused by, for example, the diffusion code $CODE_1$ is inputted from a reference signal generation unit 4 to another input terminal $2b$ of the correlator 1. Only in the case where the diffusion code which the received signal from the input terminal $2a$ has is equal to $CODE_1$, namely, when it is the same code as the diffusion code which the reference signal has, a correlation peak as shown in the diagram is outputted from an output terminal 3 of the correlator 1. The transmission data can be demodulated on the reception side by using such a correlation peak.

Even when the received signal using a code different from the code $CODE_1$ which the reference signal has is inputted to the input terminal $2a$, no correlation peak is outputted and the data cannot be demodulated.

In the above conventional example, however, there is a problem such that when the frequency of the reference signal is deviated from the frequency of the received signal, the value of the correlation peak decreases.

In addition, the number of diffusion codes cannot be set to an infinite value and the diffusion codes need to be mutually orthogonal with each other as much as possible. Therefore, the number of codes which can be used is limited and the number of terminals which can be used in the same band is also limited.

SUMMARY OF THE INVENTION

It is an object of the invention to improve receiving characteristics of a spread spectrum receiving apparatus.

Another object of the invention is to provide a spread spectrum receiving apparatus which can correctly receive a signal even when a frequency fluctuates.

Still another object of the invention is to provide a spread spectrum receiving apparatus for converting a frequency of a received signal by using a signal of the frequency according to the frequency of the received signal.

Further another object of the invention is to provide a spread spectrum receiving apparatus for converting a frequency of a received signal before an arithmetic operation unit so that an arithmetic operation output of the received signal and the diffusion code is set to be constant.

Further another object of the invention is to allocate the same code and different frequencies to a plurality of apparatuses, thereby enabling a multiplex communication to be executed.

The above and other objects and features of the present invention will become apparent from the following detailed description and the appended claims with reference to the accompanying drawings.

BRIEF DESCRIPTION OF THE DRAWINGS

FIG. 5 is a block diagram showing constructions of communication systems in the first to fourth embodiments of the invention;

DETAILED DESCRIPTION OF THE PREFERRED EMBODIMENTS

In the first embodiment, a correlator output of a receiver is detected and an output frequency of a local oscillator of a reception unit is controlled in accordance with a detection output, thereby suppressing the output frequency to the optimum oscillating frequency even when the oscillating frequency of the local oscillator fluctuates due to changes in temperature and the like. On the other hand, even for a change in transmitting frequency of a transmitter, a stable correlation output can be obtained.

Figure 1:
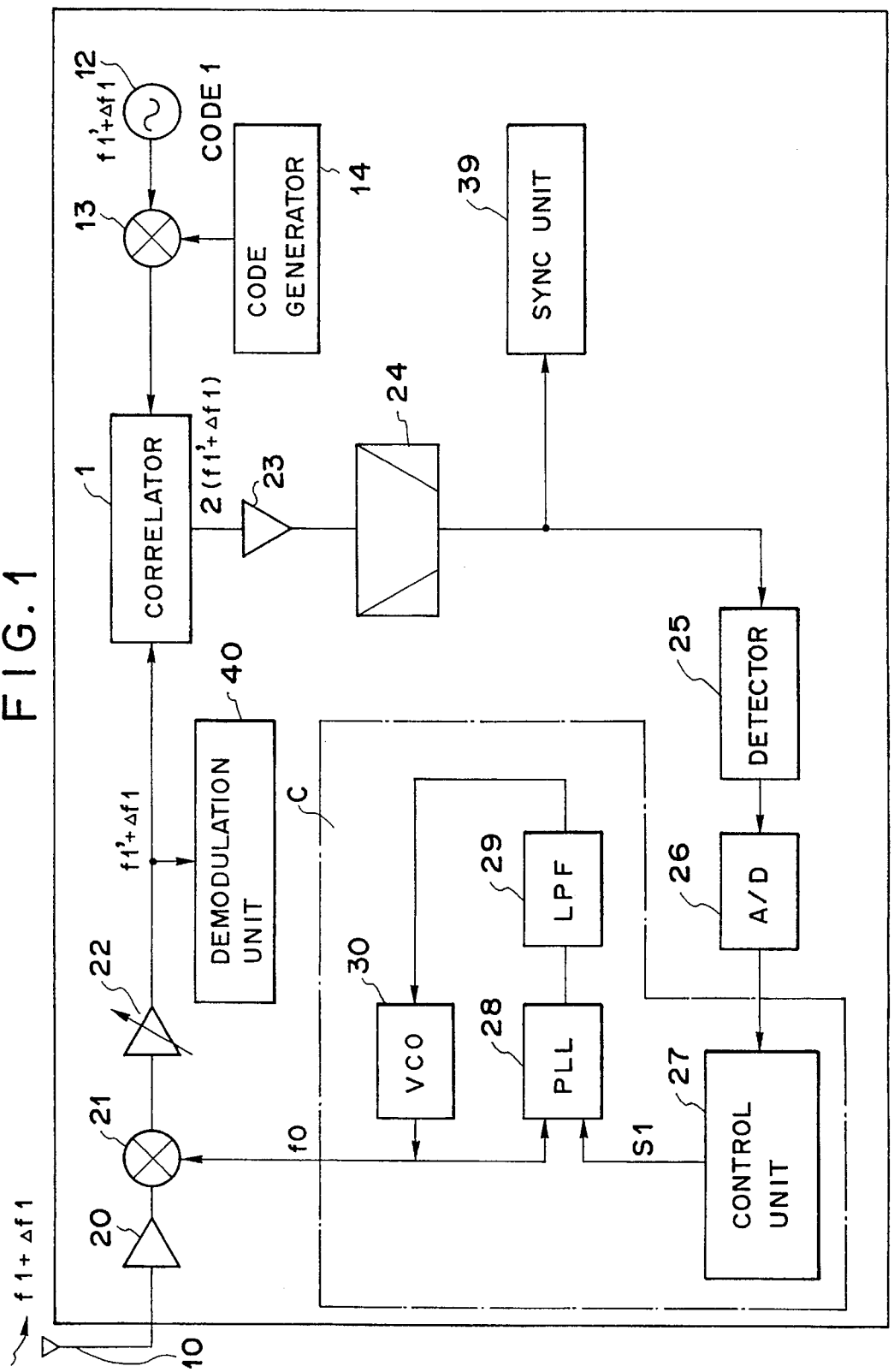
FIG. 1 is a block diagram showing a construction of a receiver in the first embodiment of the invention.

FIG. 1 is a block diagram showing a construction of the receiver in the first embodiment.

The receiver comprises: a receiving antenna 10; a low noise amplifier 20; a mixer 21 for down conversion; an AGC amplifier 22, a correlator output amplifier 23; a band pass filter 24; a detector 25; an A/D converter 26; a control unit 27; an IC 28 for PLL (phase locked loop); a loop filter 29; a VCO (voltage controlled oscillator) 30; a sync unit 39; a demodulation unit 40; the correlator (convolver) 1 as an analog device; a local oscillator 12; a mixer 13; and a code generator 14.

The operation in the construction as mentioned above will now be described.

A diffusion signal (center frequency $f_1+\Delta f_1$) which was inputted from the antenna 10 is amplified by the low noise amplifier 20 and is converted into an IF (intermediate) frequency ($f_1'+\Delta f_1$) by the mixer 21 for down conversion. The converted IF signal is supplied to one input terminal of the correlator 1. A diffusion signal of a center frequency ($f_1'+\Delta f_1$) is supplied to another input terminal of the correlator 1 through the local oscillator ($f_1'+\Delta f_1$) 12, mixer 13, and code generator 14.

A portion C surrounded by an alternate long and short dash line corresponds to a local oscillator (oscillating frequency $f_0$) having a construction of a PLL and locks the oscillating frequency of the VCO 30 to a desired frequency by using the IC 28 for PLL and the LPF 29 on the basis of set data $S_1$ which has been preset by the control unit 27.

For example, when the frequency of the transmitter is slightly deviated by ($f_1+\Delta f_1$) or the frequency $f_0$ of the local oscillator of the receiver is changed by the temperature or other factors, there is a possibility such that a correlator output decreases because the input frequency of the correlator 1 differs or that the proper level cannot be maintained. In consideration of such a problem, according to the embodiment, by providing the detector 25 at the output stage of the correlator 1, the correlator output is detected and a detection output is A/D converted by the A/D converter 26 and the converted digital signal is supplied to the control unit 27.

The optimum level of the detection output has been preset into the control unit 27. The set data which is transmitted to the PLL is controlled so as to keep the optimum level. Due to this, the signal is generated from the local oscillator by a frequency that is slightly different and the correlator output can keep a proper level.

Figure 2:
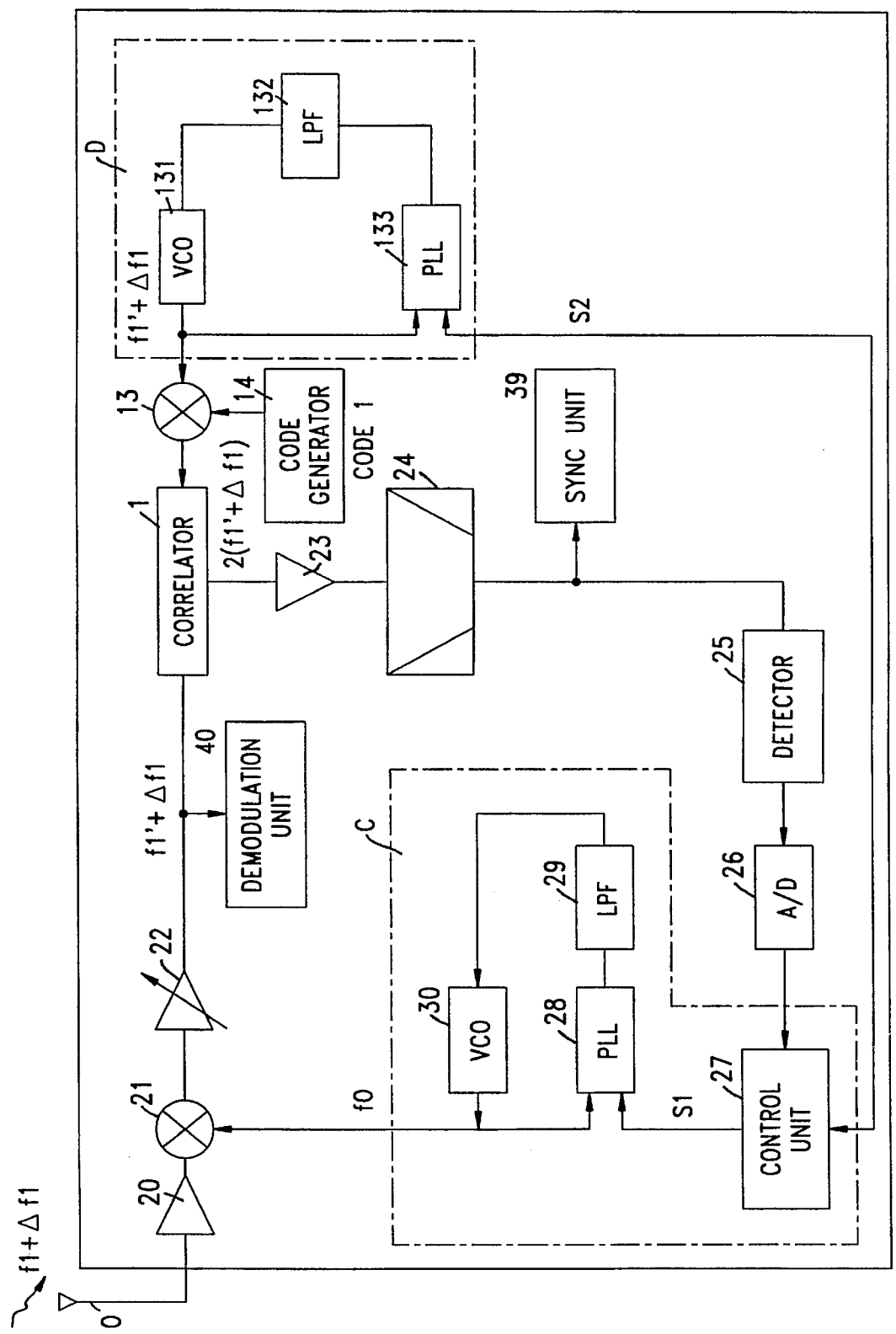
FIG. 2 is a block diagram showing a construction of a receiver in the second embodiment of the invention.

In the above first embodiment, the frequency of the local oscillator for down conversion of the receiver has been controlled in accordance with the output of the correlator. In the second embodiment, as shown in FIG. 2, the local oscillator (portion D surrounded by an alternate long and short dash line in FIG. 2) for the reference signal is set so as to have a PLL construction as shown in the diagram in accordance with the output of the correlator 1. The oscillating frequency is controlled by the set data from the control unit 27.

The set data $S_1$ and the set data $S_2$ are the different data. Oscillating frequencies of the VCO 30 and a VCO 131 are quite different.

Figure 3:
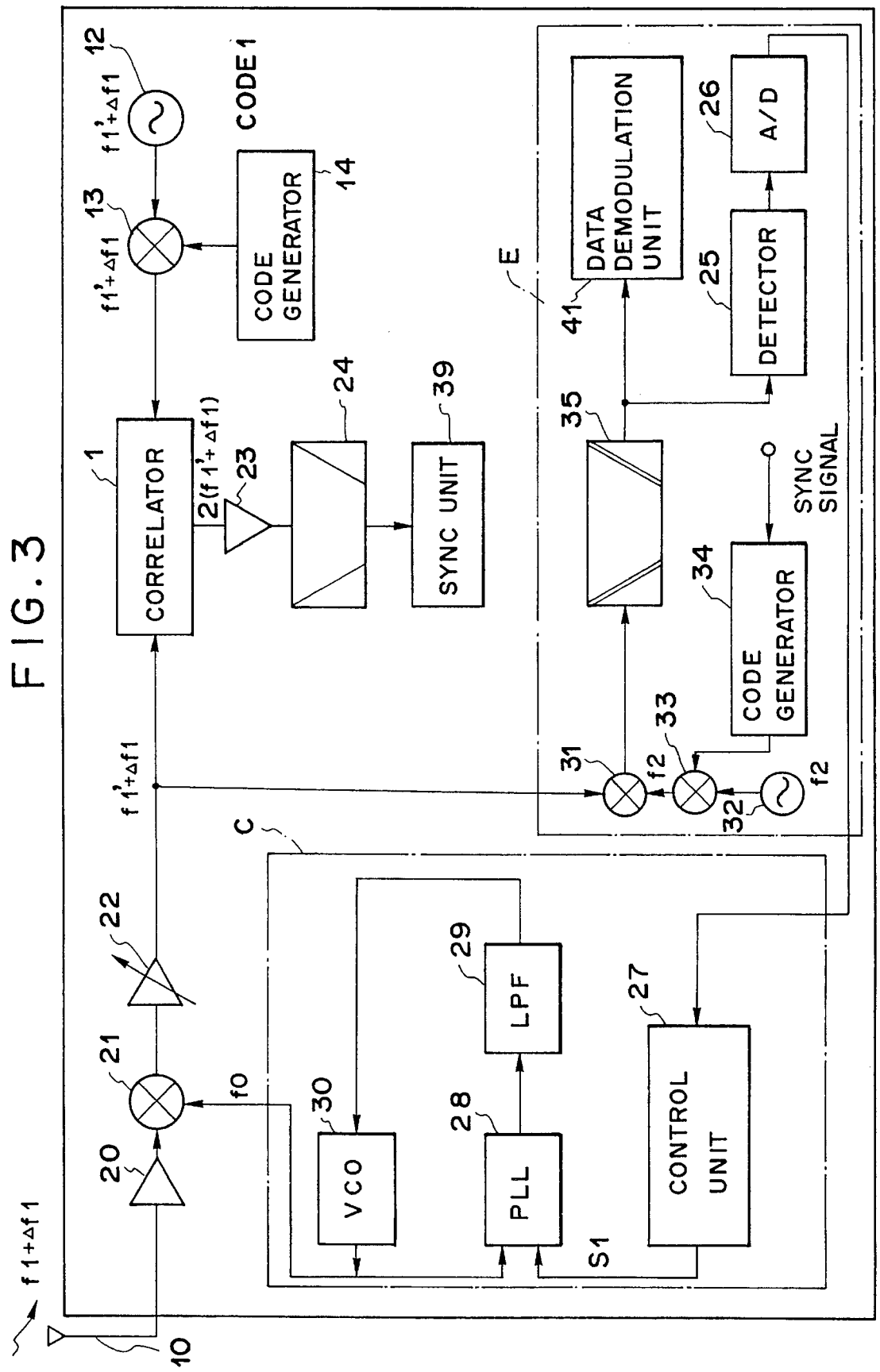
FIG. 3 is a block diagram showing a construction of a receiver in the third embodiment of the invention.

FIG. 3 is a constructional diagram of a receiver according to the third embodiment. In the diagram, reference numeral 35 denotes a band filter; 31 a mixer for inverse diffusion; 32 a local oscillator for inverse diffusion; 33 a mixer for inverse diffusion; 34 a code generator for inverse diffusion; and 41 a data demodulation unit. In FIG. 3, the portions having the same functions as those shown in FIG. 1 are designated by the same reference numerals. The mixers 13, 21, 31, and 33 are analog elements.

A diffusion code which was received and frequency converted into the IF frequency ($f_1'+\Delta f_1$) by the mixer 21 for down conversion is supplied to the correlator 1 and is also supplied to an inverse diffusion demodulation unit in a portion E surrounded by an alternate long and short dash line. In the inverse diffusion demodulation unit E, an output of the local oscillator (frequency $f_2=f_1'+\Delta f_1$) 32 is diffused by the mixer 33 by a code generated from the code generator 34 having the same code as the diffusion code which the transmitter side has previously possessed. In this instance, the diffusion code that is generated from the code generator 34 obtains a sync signal from the sync unit 39, so that its phase is matched with the phase of the diffusion code which the received diffusion signal (frequency $f_1'+\Delta f_1$) has.

Therefore, since the received signal and the signal for inverse diffusion (frequency $f_2$) are inputted to the mixer 31 for inverse diffusion by the same phase, the inverse diffusing operation can be performed and the demodulation signal of only the data component is outputted. Further, harmonics are eliminated by the BPF 35 having the band which the data has and the resultant signal is supplied to the data demodulation unit and is demodulated.

Figure 4:
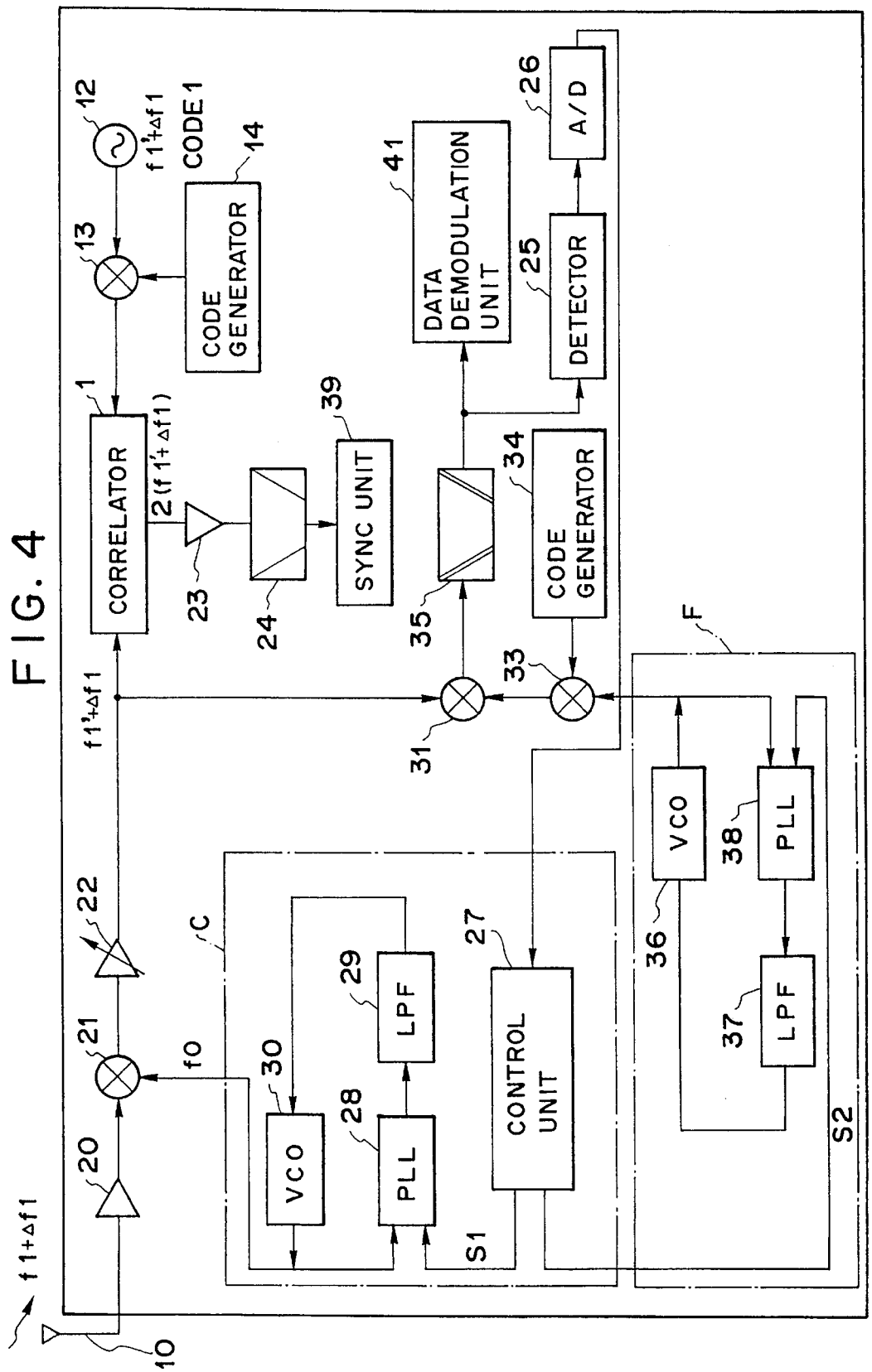
FIG. 4 is a block diagram showing a construction of a receiver in the fourth embodiment of the invention.

FIG. 4 is a schematic constructional diagram showing the fourth embodiment of a multi-dimensional connecting apparatus of the spread spectrum communication according to the invention. In the diagram, the portions having the same functions as those shown in FIG. 3 are designated by the same reference numerals.

In the third embodiment, the frequency of the local oscillator for down conversion of the receiver has been controlled in accordance with the inverse diffusion demodulation output. In the fourth embodiment, the local oscillator for inverse diffusion demodulation (portion F surrounded by an alternate long and short dash line) is constructed as a PLL, and the oscillating frequency is controlled by the set data $S_2$ from the control unit 27 in accordance with the inverse diffusion demodulation output. In the F portion, reference numeral 36 denotes a VCO; 37 an LPF; and 38 an IC for PLL. The set data $S_1$ and $S_2$ are the different data. The oscillating frequencies of the VCO 30 and VCO 36 are different.

FIG. 5 is a block diagram showing constructions of communication systems in the first to fourth embodiments of the invention.

In FIG. 5, terminals $T_1$ to $T_n$ and $K_1$ to $K_n$ communicate with terminals $T_1'$ to $T_n'$ and $K_1'$ to $K_n'$, respectively. The terminals $T_1$, $T_1'$, $K_1$, and $K_1'$ execute the communication by using the diffusion code $CODE_1$. Similarly, the terminals $T_2$, $T_2'$, $K_2$, and $K_2'$ perform the communication by using the diffusion code $CODE_2$. Further, the terminals $T_n$, $T_n'$, $K_n$, and $K_n'$ execute the communication by using the diffusion code $CODE_n$.

According to the spread spectrum communication system, generally, in the case where a plurality of terminals of the same diffusion code exist, the communication is impossible. According to the apparatus of the embodiment, however, in case of using the same code, the multiplex communication is executed by changing the transmitting frequency by only $\Delta f$.

Namely, an up frequency $f_1$ and a down frequency $f_2$ are allocated to the communication between the terminals $T_1$ to $T_n$ and the terminals $T_1'$ to $T_n'$. For instance, a frequency of (the up frequency $f_1$)+$\Delta f$ is allocated to the terminals $K_1$ to $K_n$, while a frequency of (the down frequency $f_2$)+$\Delta f$ is allocated to the terminals $K_1'$ to $K_n'$. In this manner, the transmitting frequency of the terminals using the same code is made different by only $\Delta f$. In brief, although the terminals $T_1$ and $T_1'$ and the terminals $K_1$ and $K_1'$ have the same diffusion code, the frequencies which are used are different by evey $\Delta f$.

The reason why it is possible to discriminate even in case of the same code by changing the frequency as mentioned above is based on the characteristics of the correlator, for example, convolver.

Figure 6:
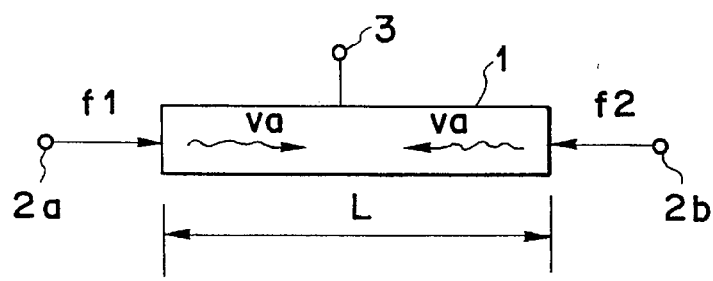
FIG. 6 is a schematic diagram for explaining characteristics of convolvers in the first to fourth embodiments.

FIG. 6 is a schematic diagram for explaining the characteristics of the convolver 1 (used as a correlator 1).

The signals which have the frequencies $f_1$ and $f_2$ and were diffused by the diffusion code in which the same code had been inverted on the time base are inputted to the two input terminals $2a$ and $2b$ of the convolver 1, respectively.

Now, assuming that a length of convolver 1 is set to L and a transfer speed of a surface acoustic wave which propagates on the convolver 1 is set to $V_a$ (for example, $V_a$=3500 m/sec), a condition such that the correlator output can be taken out to the output terminal 3 is expressed by $|f_1-f_2|<2\pi V_a/L$.

Namely, now assuming that the frequency (diffused by the diffusion code) of the reference signal is set to $f_2$ and the frequency of the received signal is set to $f_1$, when a difference between $f_1$ and $f_2$ is equal to or larger than $2\pi V_a/L$ (Hz), no correlator output is outputted from the output terminal 3.

Therefore, even when the diffusion code by which the reference signal was diffused and the diffusion code by which the received signal was diffused are the same code $CODE_1$, since the frequencies are different, the correlation peak is not obtained and even in case of the same code, the discrimination can be performed.

Figure 7A:
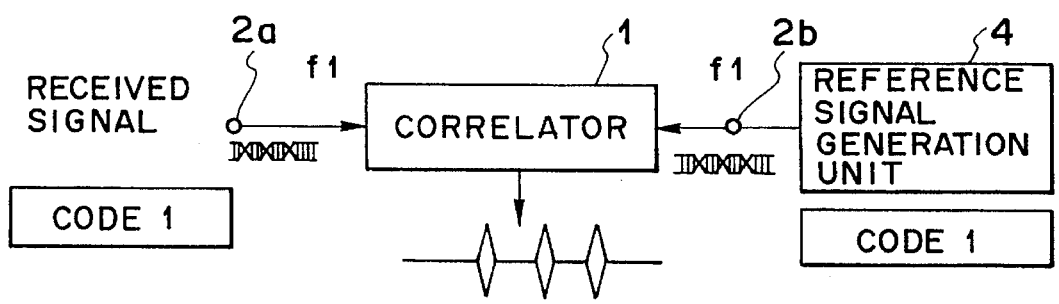
FIGS. 7A and 7B are schematic diagrams showing situations upon demodulation of the received signals in the first to fourth embodiments.
Figure 7B:
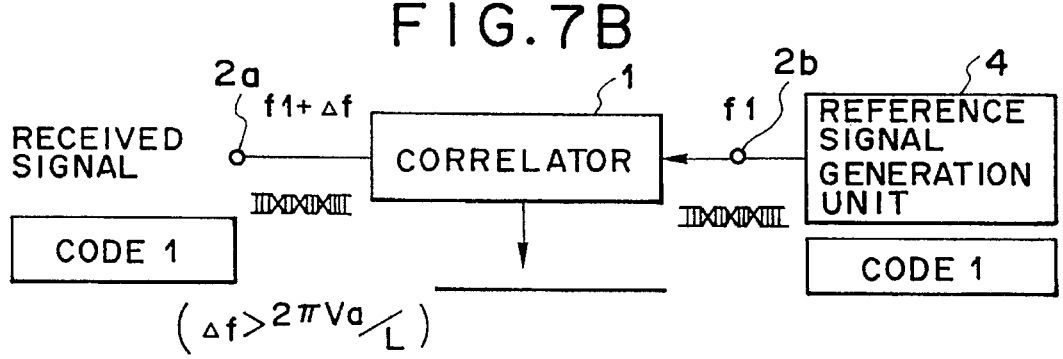

FIGS. 7A and 7B are schematic diagrams showing situations upon demodulation.

FIG. 7A shows the case where the diffusion code of the received signal coincides with the diffusion code of the reference signal and their frequencies also coincide. FIG. 7A shows a state in which the correlator output is derived from the output terminal 3.

On the other hand, FIG. 7B shows the correlator output from the output terminal 3 in the case where the frequency of the received signal is away from the frequency of the reference signal by only $\Delta f$ ($\Delta f>2\pi V_a/L$).

Although the diffusion codes are set to the same code $CODE_1$, since the frequencies are away from each other by only $\Delta f$, no correlator output is obtained.

In the embodiment, therefore, in spite of the fact that the terminals $T_1$, $T_1'$, $K_1$, and $K_1'$ having the code $CODE_1$ and the terminals $T_2$, $T_2'$, $K_2$, and $K_2'$ having the code $CODE_2$ possess the same codes $CODE_1$ and $CODE_2$, respectively, by changing their frequencies by every $\Delta f$, the terminals can be discriminated without mutually interfering. The terminal $T_1$ can communicate with the terminal $T_1'$, the terminal $K_1$ can communicate with the terminal $K_1'$, and the like. In this manner, the communication can be executed.

Figure 8:
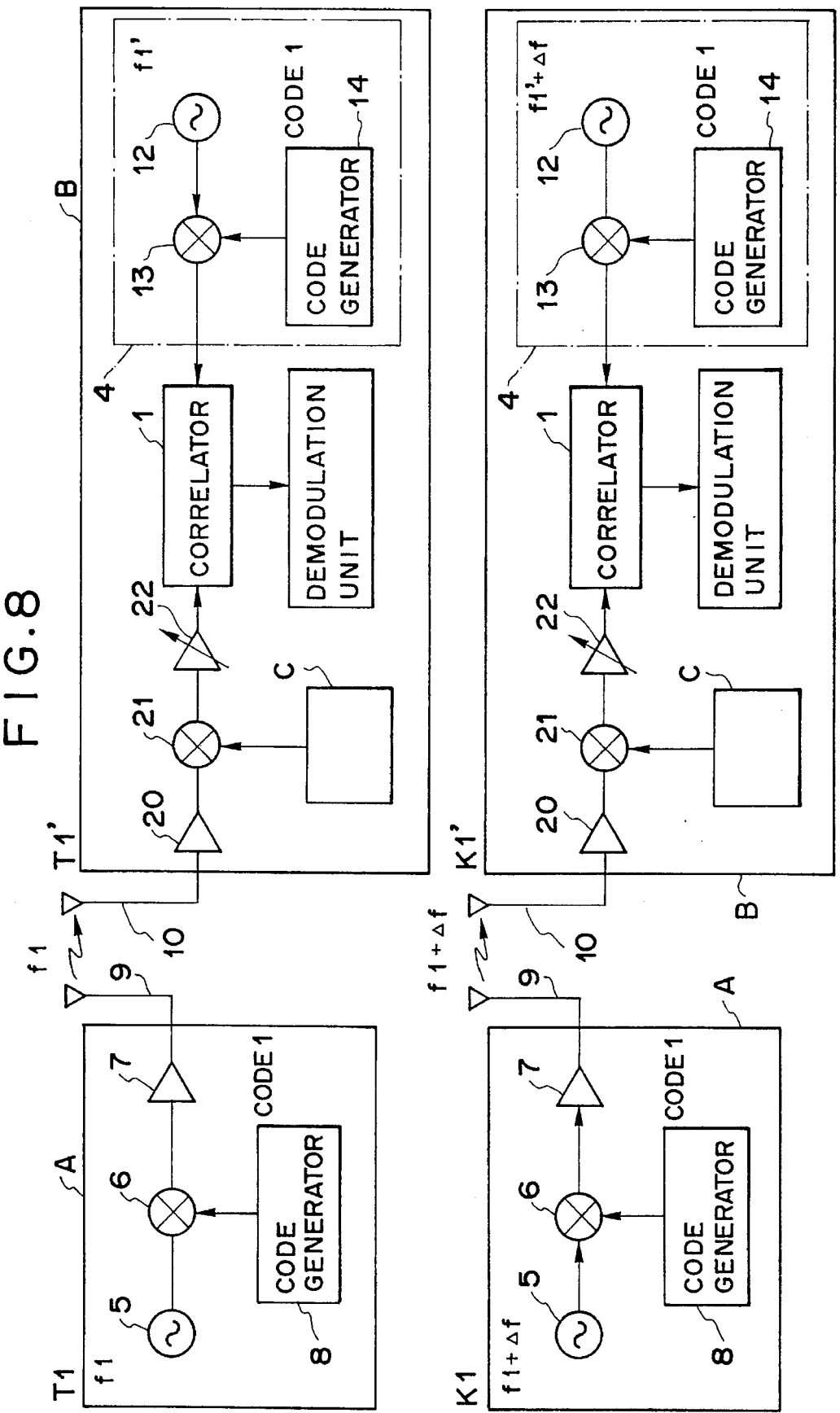
FIG. 8 is a block diagram showing a specific system construction of the first embodiment.

FIG. 8 is a block diagram showing a specific system construction of the embodiment.

In the diagram, A denotes constructions of the transmission units of the terminals $T_1$ and $K_1$. B denotes constructions of reception units of the terminals $T_1'$ and $K_1'$.

For example, in the terminal $T_1$, the diffusion signal having the center frequency $f_1$ propagates into the air by the antenna 9 through the amplifier 7 by the local oscillator 5 of the frequency $f_1$, the mixer 6, and the code generator 8 having the code $CODE_1$.

Similarly, the diffusion signal of the center frequency $f_1+\Delta f$ which was diffused by the same diffusion code $CODE_1$ is generated from the terminal $K_1$.

The reference signal generation units 4 in the reception units B of the terminals $T_1'$ and $K_1'$ have the reference signals of the frequency $f_1'$ and $(f_1'+\Delta f)$ and discriminate the received signals from the terminals $T_1$ and $K_1$ by the frequency.

That is, although all of the terminals $T_1$, $K_1$, $T_1'$, and $K_1'$ use the same diffusion code $CODE_1$, since the frequencies of the reference signals which are inputted to the correlators 1 are different, they are not interfered with each other.

Figure 9:
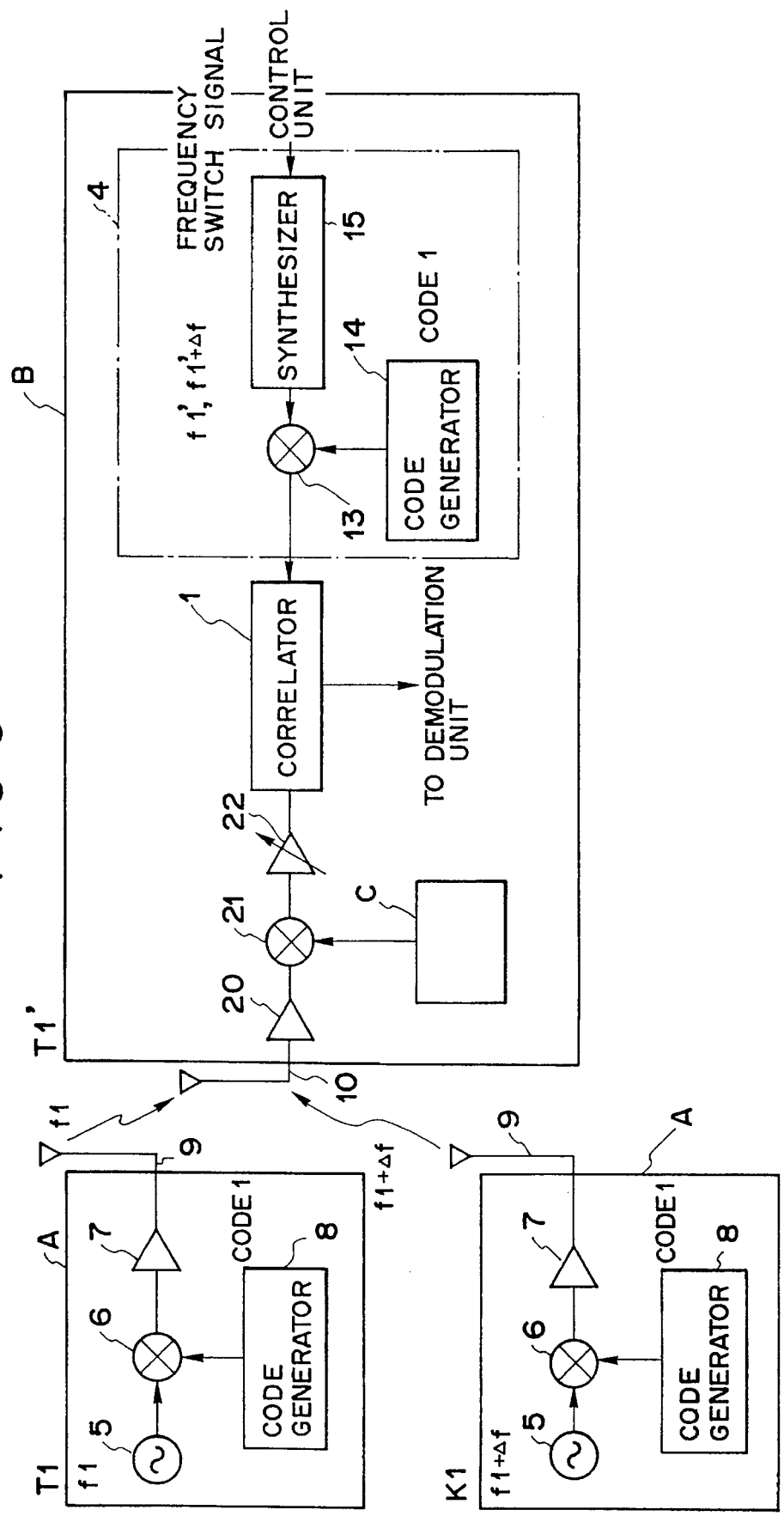
FIG. 9 is a block diagram showing a specific second system construction in the first to fourth embodiments of the invention.
Figure 10:
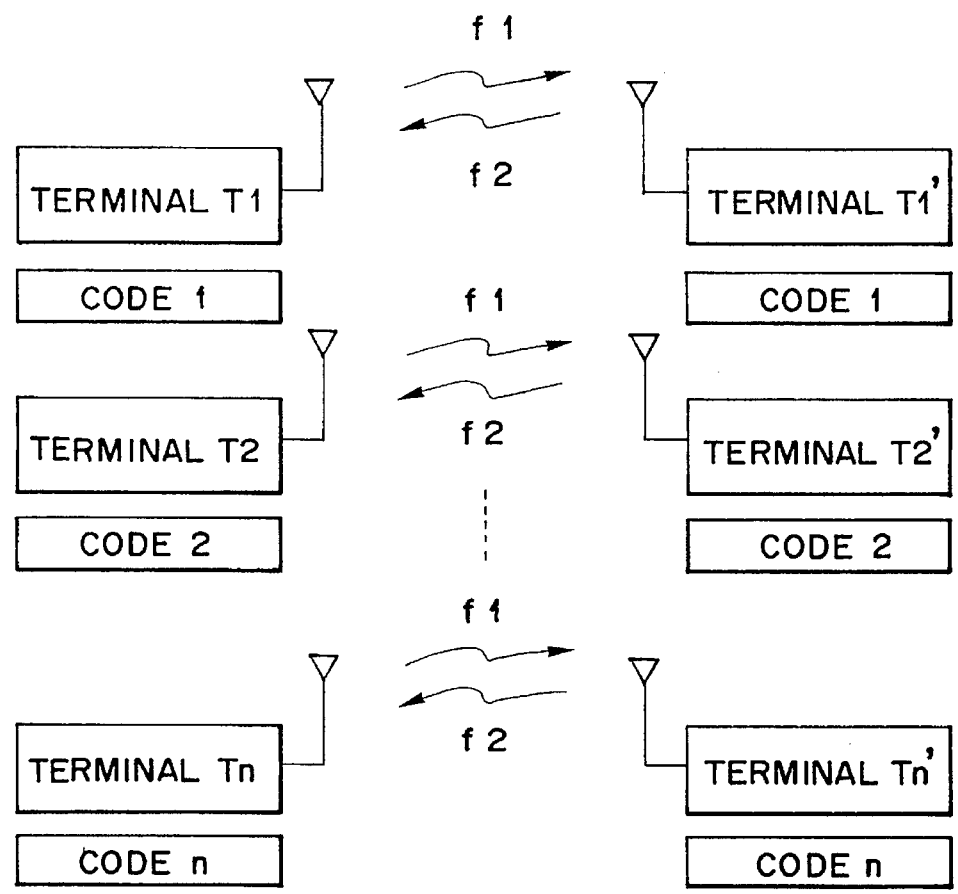
FIG. 10 is a block diagram showing a constructional example of a conventional communication system.
Figure 11:
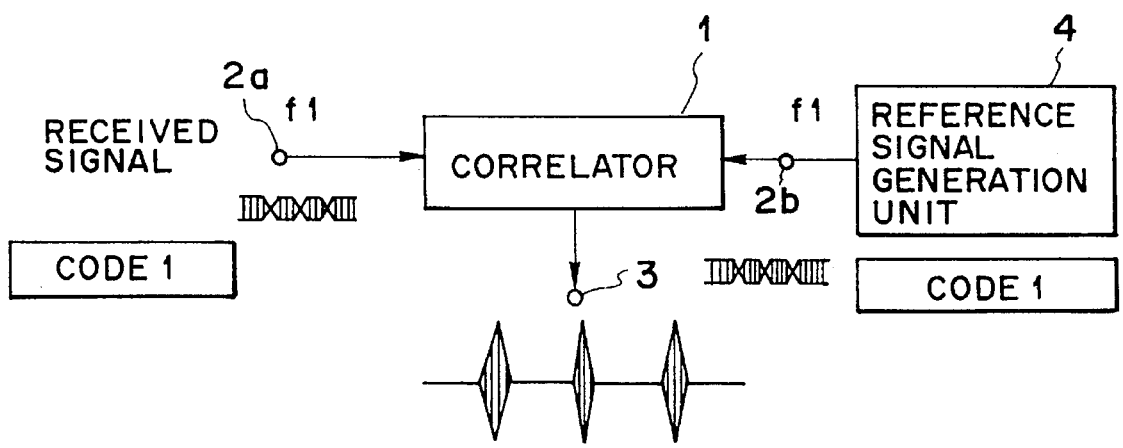
FIG. 11 is a block diagram for explaining a principle of a multi-dimensional connection using a conventional convolver.

FIG. 9 is a block diagram showing a specific second system construction of the embodiment.

FIG. 8 relates to the case where in the terminals $T_1'$ and $K_1'$, the frequencies of the local oscillators 12 in the reference signal generation units 4 in the reception units B are the frequencies which were fixed every terminal. FIG. 9 differs from FIG. 8 with respect to a point that the frequency is made variable by using a synthesizer 15. Thus, the communication with a plurality of terminals having the same code can be executed by switching the frequency.

In this case, the initial value of the set data $S_1$ of the control unit 27 is switched in accordance with a frequency of the synthesizer 15.

Although the invention has been described with respect to the preferred embodiments, the invention is not limited to the foregoing embodiments but many modifications and variations are possible within the spirit and scope of the appended claims of the invention.

What is claimed is:

1. A receiving apparatus for receiving a spread spectrum signal, comprising:

converting means for converting a frequency of the spread spectrum signal from a transmission frequency;

first generating means for generating a synchronization signal based on the spread spectrum signal and a reference code for synchronization;

second generating means for generating a de-spreading signal synchronously with the synchronization signal; and de-spreading means for de-spreading the spread spectrum signal whose frequency is converted by said converting means based on the de-spreading signal, wherein said converting means converts the frequency of the spread spectrum signal in accordance with an output of said de-spreading means.

2. An apparatus according to claim 1, wherein said de-spreading means includes a multiplier.

3. An apparatus according to claim 1, wherein said de-spreading means includes an analog device.

4. An apparatus according to claim 1, wherein said converting means includes:

an oscillator;

a mixer to mix the received signal and an output signal of said oscillator; and control means for controlling a frequency of the output signal of the oscillator in accordance with the output of said de-spreading means.

5. An apparatus according to claim 4, wherein said control means has an A/D converter for analog/digital converting the output of the de-spreading means and controls the frequency in accordance with a digital output of said A/D converter.

6. An apparatus according to claim 1, wherein said second generating means includes:

an oscillator; and a mixer to mix a de-spreading code and an output signal of said oscillator;

wherein said oscillator oscillates at a frequency according to an output signal of said de-spreading means.

7. An apparatus according to claim 1, wherein said converting means converts the frequency of the received signal into the intermediate frequency.

8. An apparatus according to claim 1, wherein said converting means converts the frequency of the received signal so as to set an output of said converting means to be constant.

9. An apparatus according to claim 1, wherein said second generating means generates the de-spreading signal spread by a de-spreading code; and the de-spreading code is common to another receiving apparatus and a frequency of the de-spreading signal is different from that of another receiving apparatus.

10. An apparatus according to claim 9, wherein said first generating means includes a surface acoustic wave convolver, and the frequency of said reference signal is away from a frequency of a reference signal of another receiving apparatus by $2\_V_d/L$ ($V_a$ is a propagation speed of a surface acoustic wave, L is a length of convolver) or more.

11. An apparatus according to claim 1, wherein said first generating means generates the synchronization signal based on the spread spectrum signal convened by said converting means.

12. A method for receiving a spread spectrum signal, comprising:

a first generating step of generating a synchronization signal based on the spread spectrum signal and a reference code for synchronization;

a second generating step of generating a de-spreading signal synchronously with the synchronization signal;

a de-spreading step of de-spreading the spread spectrum signal based on the de-spreading signal; and an adjusting step of adjusting a frequency of the spread spectrum signal from a transmission frequency, in accordance with the synchronization signal, wherein the synchronization signal is generated in said first generating step based on the reference code and the spread spectrum signal whose frequency is adjusted in said adjusting step.

13. A method according to claim 12, wherein a correlator is used for generating the synchronization signal in said first generating step.

14. A receiving apparatus for receiving a spread spectrum signal, comprising:

first generating means for generating a synchronization signal based on the spread spectrum signal and a reference code for synchronization;

second generating means for generating a de-spreading signal synchronously with the synchronization signal;

de-spreading means for de-spreading the spread spectrum signal based on the de-spreading signal; and adjusting means for adjusting a frequency of the spread spectrum signal from a transmission frequency, in accordance with the synchronization signal, wherein the synchronization signal is generated in said first generating step based on the reference code and the spread spectrum signal whose frequency is adjusted in said adjusting step.

15. An apparatus according to claim 14, wherein said adjusting means adjusts the frequency of the spread spectrum signal based on said second generation means and said de-spreading means.

16. An apparatus according to claim 14, wherein said first generating means includes a correlator for correlating the spread spectrum signal and the reference code.

17. An apparatus according to claim 14, wherein said de-spreading means de-spreads the frequency of the spread spectrum signal whose frequency is adjusted by said adjusting means.

18. A method according to claim 12, wherein the spread spectrum signal whose frequency is adjusted in said adjusting step is de-spread in said de-spreading step.

19. A method for receiving a spread spectrum signal comprising:

a first generating step of generating a synchronization signal based on the spread spectrum signal and a reference code for synchronization;

a second generating step of generating a de-spreading signal synchronously with the synchronization signal;

a de-spreading step of de-spreading the spread spectrum signal based on the de-spreading signal; and an adjusting step of adjusting a frequency of the spread spectrum signal from a transmission frequency, in accordance with an output of said de-spreading step, wherein the spread spectrum signal whose frequency is adjusted in said adjusting step is de-spread in said de-spreading step.

20. A method according to claim 19, wherein a correlator is used for generating the synchronization signal in said first generating step.

21. A method according to claim 19, wherein the synchronization signal is generated in said first generating step based on the reference code and the spread spectrum signal whose frequency is adjusted in said adjusting step.

* * * * *